(12) United States Patent
Chen

(10) Patent No.: US 6,609,808 B2
(45) Date of Patent: Aug. 26, 2003

(54) FRAME FOR FIXING LIGHT GUIDE PLATE AND BACKLIGHT UNIT THEREOF

(75) Inventor: Hao-Chih Chen, Taichung (TW)

(73) Assignee: Au Optronics Corp., Hsinchu (TW)

( * ) Notice: Subject to any disclaimer, the term of this patent is extended or adjusted under 35 U.S.C. 154(b) by 0 days.

(21) Appl. No.: 10/053,163

(22) Filed: Jan. 15, 2002

(65) Prior Publication Data

US 2002/0093811 A1 Jul. 18, 2002

(30) Foreign Application Priority Data

Jan. 16, 2001 (TW) ........................................ 90100900 A

(51) Int. Cl.⁷ ................................................ F21V 7/04
(52) U.S. Cl. ............................ 362/31; 362/31; 362/26; 362/27; 362/561; 362/581; 349/58; 52/208; 52/397; 52/716; 49/504; 49/505; 49/380

(58) Field of Search ............................... 362/31, 26, 27, 362/561, 581; 349/58; 52/208, 397, 716; 49/504, 505, 380

Primary Examiner—Sandra O'Shea
Assistant Examiner—Tsidulko
(74) Attorney, Agent, or Firm—Ladas & Parry

(57) ABSTRACT

A backlight unit for a liquid crystal display is disclosed. The unit includes a light guide plate, a reflector, a light source and a frame. The light guide plate further includes a protrusion located on the side surface of the light guide plate, and the frame further includes a first groove, a second groove and a fixing portion. The first groove is connected with the fixing portion, and the second groove is also connected with the fixing portion. The light guide plate is combined with the frame by gliding and inserting the protrusions into the fixing portion through the first and second grooves.

16 Claims, 7 Drawing Sheets

FRAME FOR FIXING LIGHT GUIDE PLATE AND BACKLIGHT UNIT THEREOF

BACKGROUND OF THE INVENTION

1. Field of the Invention

The invention relates to a backlight unit, and more particularly to a backlight unit for improving assembly efficiency and reducing light guide plate damage.

2. Description of the Related Art

FIG. 1A is a three dimensional diagram schematically showing a conventional backlight unit of liquid crystal display. As shown in FIG. 1A, the conventional backlight unit has a frame 10, a light guide plate 40 and a reflector 30. The reflector 30 is connected to the frame 10 by fixing the screws 35 in the screw holes (not shown in the drawing) positioned on the frame 10.

FIG. 1B is an exploded diagram of FIG. 1A showing the structure of the conventional backlight unit. As shown in FIG. 1B, a reflecting sheet 20 is positioned above the frame 10. The light guide plate 40 is positioned on the reflecting sheet 20, The light guide plate 40 has a pair of protrusions 42 of the light guide plate 40 inserted in the grooves 12 of the frame 10. A lamp 34 is installed inside the reflector 30, and then the screws 35 are positioned into the screw holes 15 of the frame 10 so as to combine the two sides 32 of the reflector 30 with the frame 10. Finally, the backlight unit is accomplished after installing a diffusing device 50 on the light guide plate 40. The diffusing device 50 includes a diffusing sheet 52, a prism sheet 54 and a protecting film 56. A display panel, such as a liquid crystal panel 60, is combined with the backlight unit to form a display deice, such as a liquid crystal display.

Referring to FIG. 1B, the frame 10 has three arms, and the openings of the grooves 12 face upward. The light guide plate is fixed with three sides of the frame 10, so the supporting force of the frame is insufficient. Thus, this design is insufficient to protect the light guide plate.

FIG. 1C shows another frame 11. The frame 11 has four arms to prevent it from distortion and to increase the force for fixing the light guide plate. One arm 111 of the frame 11 has a groove 13, and the opening of the groove 13 faces toward the light guide plate 40. When the light guide plate is combined with the frame 11, the frame 11 is distorted in order to install the protrusion 42 of the light guide plate 40 into the groove 13 of the frame 11. However, as the force goes beyond the limit, the frame 11 is deformed and damages the light guide plate 40 and the diffusing device 50.

The light guide plate easily departs from the frame when the conventional backlight unit is jarred or positioned upside down. In the same time, the surface of the light guide plate is scraped easily, and the distance between the lamp and the light guide plate is changed easily to influence optical properties.

SUMMARY OF THE INVENTION

To solve the above problems, it is an object of the present invention to provide a frame of a backlight unit in a liquid crystal display. The frame includes a fixing arm. The fixing arm comprises a fixing portion, a first groove, and a second groove. The fixing portion has a first fixing side and a fixing second side, the first groove has a first end, and the second groove has a second end. The first groove is connected with the fixing portion, and the first fixing side of the fixing portion is aligned to the first end of the first groove. The second groove is connected with the fixing portion, and the second fixing side of the fixing portion is aligned to the second end of the second groove.

In addition, the first groove has a third end, the second groove has a fourth end. The first groove has a first distance between the first end and the third end, the second groove has a second distance between the second end and fourth end, and the fixing portion has a third distance between the first and the second fixing sides. The sum of the first and second distances is not less than the third distance. The first distance is smaller than the third distance, and the second distance is smaller than the third distance.

Further, the frame for fixing a light guide plate includes two opposite fixing arms. Each fixing arm has a first groove, a first fixing pin, a second groove, and a second fixing pin. The first groove has a first opening, and the second groove has a second opening. The first fixing pin has a fourth distance to the first opening, the second fixing pin has a fifth distance to the second opening, and a sum of the fourth and fifth distances is larger than a thickness of the frame.

The fixing portion is formed between the first groove and the second groove. The fixing portion has a fixing portion length, the first fixing pin has a first pin length, the second fixing length has a second pin length, and a sum of the first pin length and the second pin length is not greater than the fixing portion length.

The invention also includes a backlight unit for a liquid crystal display. The backlight unit includes at least a light guide plate and a frame. The light guide plate has a light-incident surface, a light-reflecting surface, and two side surfaces formed at both sides of the light-incident surface. Each side surface has a protrusion. The frame comprises two opposite fixing arms, and each fixing arm has a first groove, a second groove and a fixing portion. The first groove has a first end, the second groove has a second end, and the fixed portion has a first fixing side and a second fixing side. The first fixing side of the fixing portion is aligned to the first end of the first groove, and the second fixing side of the fixing portion is aligned to the second end of the second groove. The light guide plate is combined with the frame by gliding and inserting the protrusion into the fixing portion through the first and second grooves. The first groove has a third end, the second groove has a fourth end, the first groove has a first distance between the first end and the third end, the second groove has a second distance between the second end and fourth end, the fixing portion has a third distance between the first and second fixing sides, and a sum of the first and second distances is not less than the third distance. The first distance is smaller than the third distance, and the second distance is smaller than the third distance. Each fixing arm comprises a first fixing pin and a second fixing pin, the first groove has a first opening, the second groove has a second opening, the frame has a thickness, the first fixing pin has a sixth distance to the first opening, the second fixing pin has a seventh distance to the second opening, and a sum of the sixth and seventh distances is larger than the thickness of the frame. A first pin length of the first fixing pin plus a second pin length of the second fixing pin is not greater than the third distance of the fixing portion. A height of each protrusion is not greater than a thickness of the light guide plate. The backlight unit for a liquid crystal display further includes a reflector having a reflecting surface toward the light-incident surface of the light guide plate, and a light source installed within the reflector. The reflector reflects lights of the light source. The backlight unit also includes a reflecting sheet positioned under the light guide plate and a diffusing device located above the light guide plate. The diffusing device has a diffusing sheet, a prism sheet and a protecting film, and the protecting film is adjacent to the light guide plate.

The invention also includes another backlight unit for a liquid crystal display. The backlight unit has a light guide plate having a side surface, a protrusion formed on the side surface, and a frame having a height H. The frame has a first groove with a first height h1 and a first width d1, and a second groove with a second height h2 and a second width d2. The frame also has a fixing portion with a third height h3 and a third width D. The third width D of the fixing portion is not greater than a sum of the first width d1 and the second width d2. The height H of the frame is not greater than a sum of the first is height h1, the second height h2, and the third height h3. The light guide plate is combined with the frame by gliding and inserting the protrusion into the fixing portion through the first and second grooves.

In addition, the protrusion has a fourth height h4 and a fourth width d4, the fourth width d4 is not greater than the third width D, and the fourth height h4 is not greater than the third height h3. The fourth height h4 is not greater than a thickness of the light guide plate.

BRIEF DESCRIPTION OF THE DRAWINGS

This and other objects and features of the invention will become clear from the following description, taken in conjunction with the preferred embodiments with reference to the drawings, in which.

DETAILED DESCRIPTION OF THE PREFERRED EMBODIMENTS

Figure 1A:
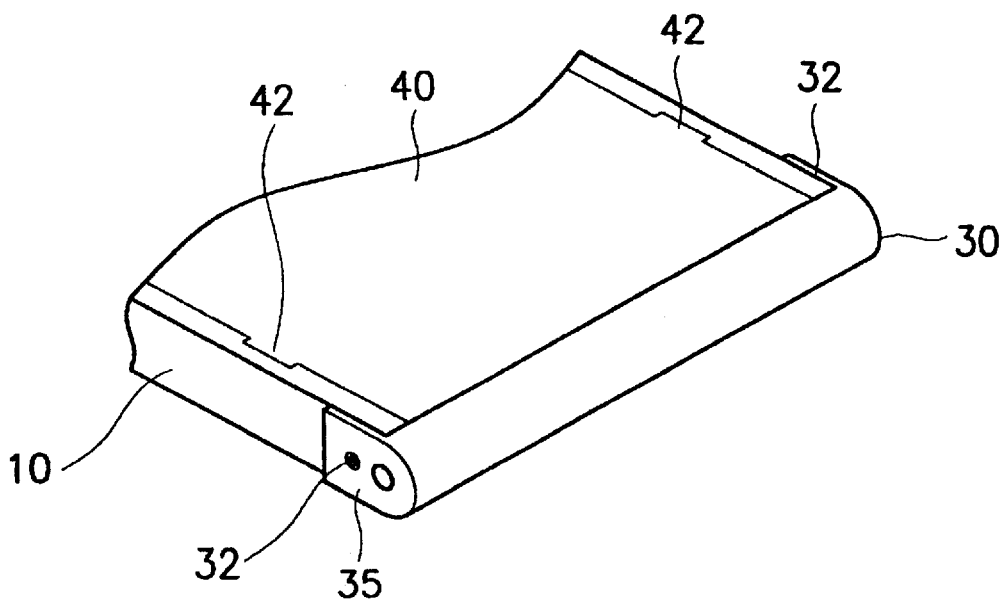
FIG. 1A is a three dimensional diagram schematically showing a conventional backlight unit of the liquid crystal display.
Figure 1C:
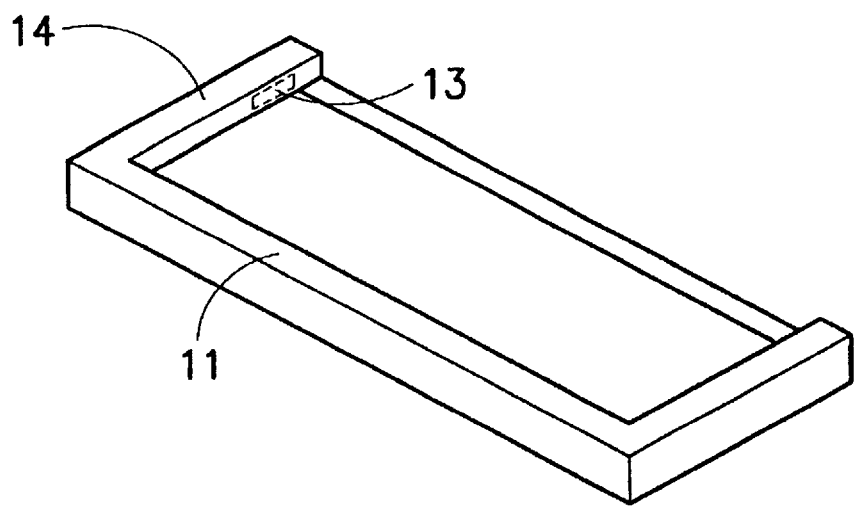
FIG. 1C schematically shows a frame of the conventional backlight unit.
Figure 1B:
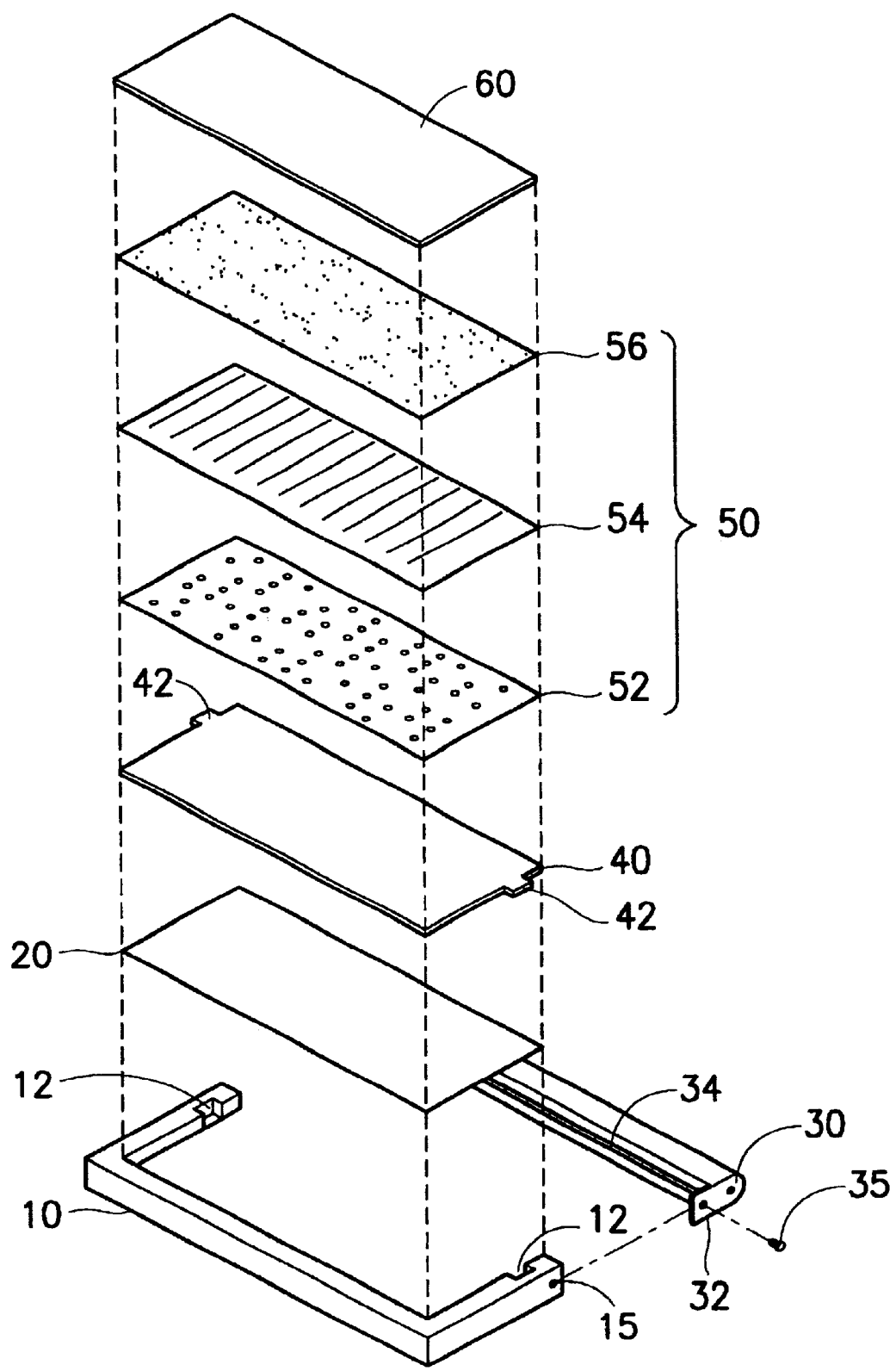
FIG. 1B is an exploded diagram of FIG. 1A schematically showing the composition of the conventional backlight unit.
Figure 2:
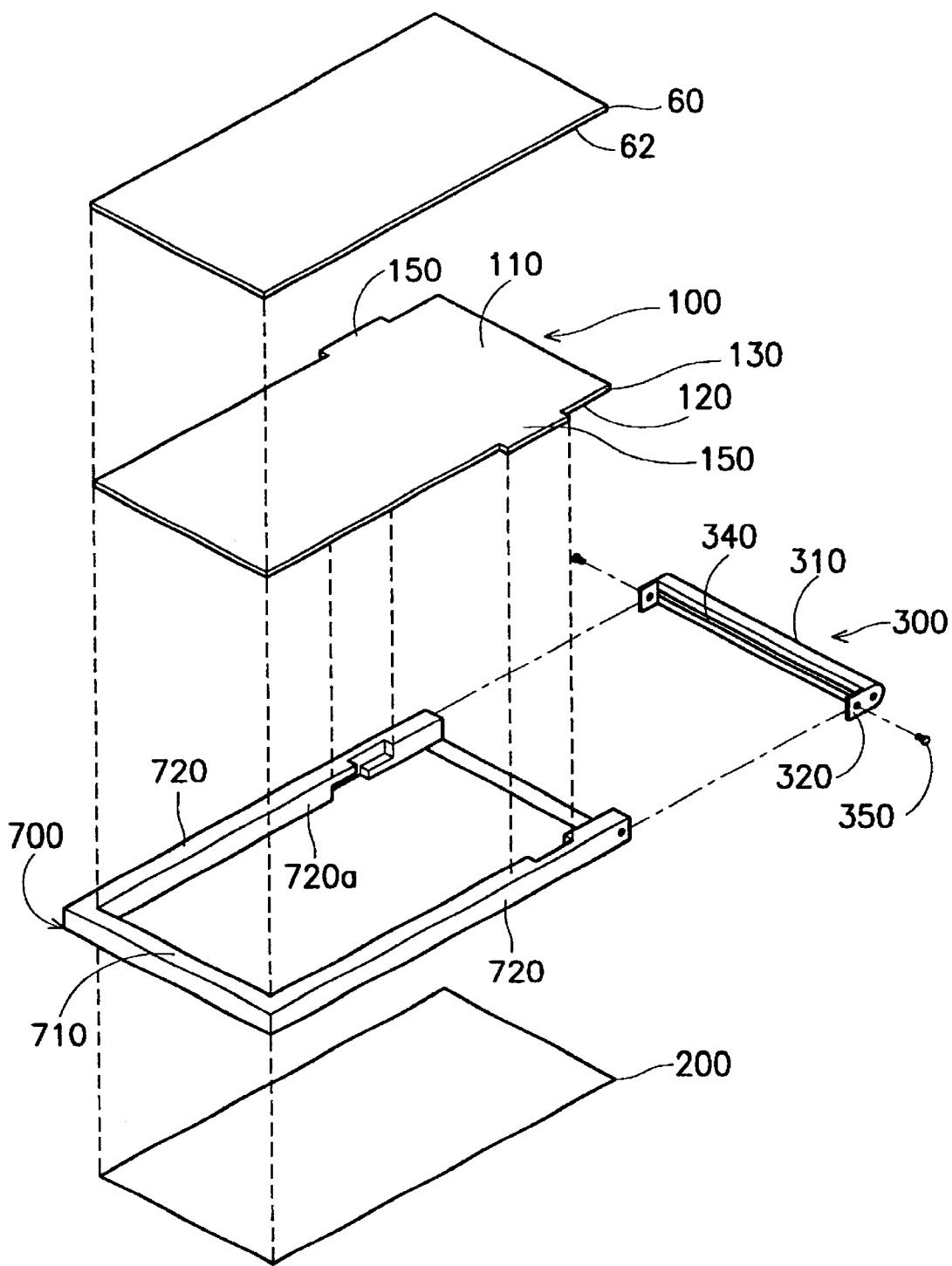
FIG. 2 schematically shows a backlight unit of the invention.

FIG. 2 is a three-dimensional diagram showing a backlight unit of the liquid crystal display of the invention. As shown in FIG. 2, the backlight unit of the invention includes a light guide plate 100, a reflecting sheet 200, a reflector 300, a light source 340 and a frame 700.

The light guide plate 100 has a light-transmitting surface 110, a light-reflecting surface 120, a light-incident surface (not shown) and two side surfaces 130. These side surfaces 130 are positioned at both sides of the light-incident surface. The light-transmitting surface 110 of the light guide plate 100 is adjacent to a light-entrance surface 62 of the liquid crystal panel 60, and the light-reflecting surface 120 of the light guide plate 100 is mounted above the reflecting sheet 200. The light guide plate 100 further includes at least two protrusions 150, each protrusion 150 is respectively located on the side surface 130 of the light guide plate 100.

The reflector 300 has a reflecting surface 210 toward the light-incident surface, and two supporting devices 320 extended from both sides of the reflecting surface 310 toward the two side surfaces 130 of the light guide plate 100.

The light source 340, such as a lamp, is installed within the reflector 300. The reflector 300 surrounds the lamp 340, and the light emitted from the lamp 340 is reflected to the light guide plate 100. Moreover, a reflecting sheet 200 can reflect lights passing through the light-reflecting surface 120 back to the light guide plate 100 again.

Figure 3A:
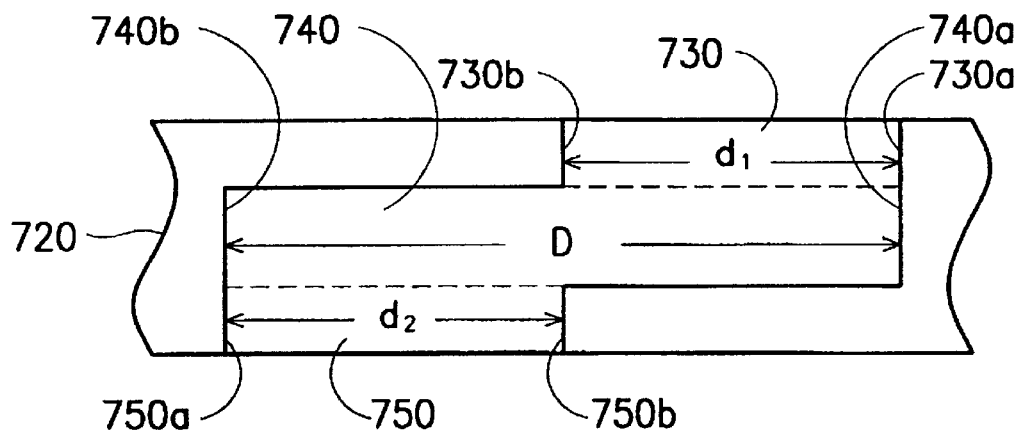
FIGS. 3A to 3C are side views showing the frame of the backlight unit of the invention.
Figure 3B:
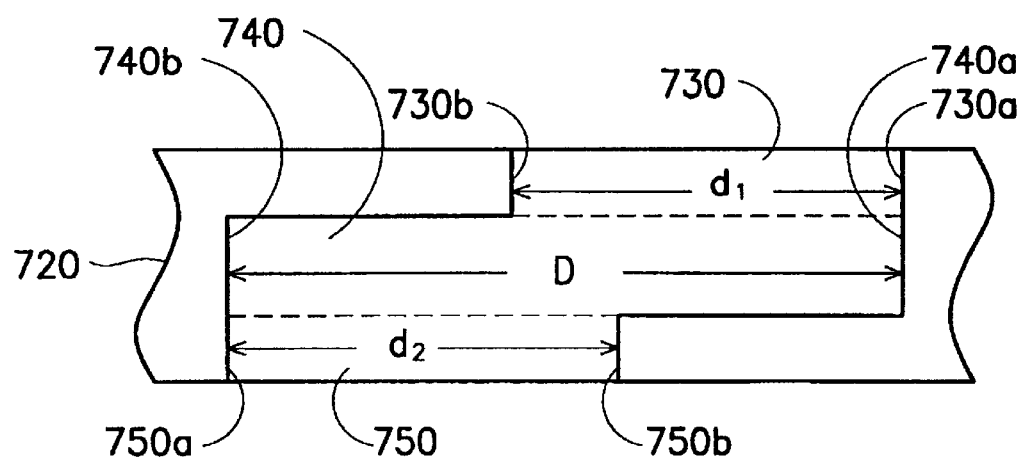

The frame 700 has a pair of fixing arms 720 and a pair of linking arms 710, and each linking arm 710 is connected with the two fixing arms 720. One side 720a of each fixed arm 720 facing the light guide plate 100 has a first groove 730, a second groove 750 and a fixing portion 740 as shown in FIG. 3A. The fixing portion 740 positioned between the first groove 730 and the second groove 750 can hold the light guide plate 100. FIGS. 3A and 3B are side views showing the dimensions of the two grooves on the fixing arms of the invention.

The fixing portion 740 has a first fixing side 740a and a fixing second side 740b. The first groove 730 has a first end 730a and a third end 730b. The second groove 750 has a second end 750a and a fourth end 750b. The first fixing side 740a of the fixing portion 740 is aligned to the first end 730a of the first groove 730, and the second fixing side 740b of the fixing portion 740 is aligned to the second end 750a of the second groove 750. The first groove 730 is connected with the fixing portion 740, the second groove 750 is connected with the fixing portion 740. The first groove has a first distance d1 between the first end 730a and the third end 730b, the second groove 750 has a second distance d2 between the second end 750a and fourth end 750b, and the fixing portion 740 has a third distance D between the first and the second fixing sides 740a, 740b. The sum of the first and second distances d1, d2 is not less than the third distance D, that is d1+d2≧D. In FIG. 3A, d1+d2=D. In FIG. 3B, d1+d2>D. The first distance d1 is the width of the first groove 730, the second distance d2 is the width of the second groove 750, and the third distance D is the width of the fixing portion 740.

Figure 3C:
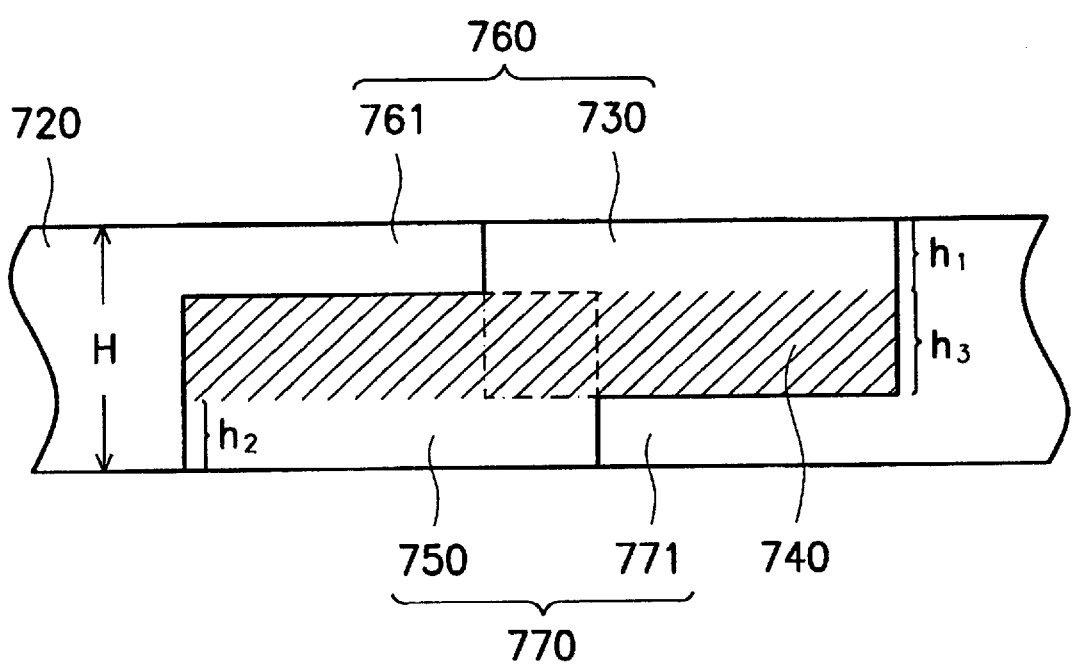

FIG. 3C is a side view schematically showing the dimensions of the two grooves on the fixing arms of the invention. Each fixing arm 720 further includes a first fixing pin 761 and a second fixing pin 771. The height hi of the first groove can equal the height of the first fixing pin, and the height h2 of the second groove can equal the height of the second fixing pin. The height of the fixing portion 740 is h3, and the thickness of the frame is H. The first groove 730 has a first opening, the second groove 750 has a second opening, the first fixing pin has a fourth distance to the first opening, and the second fixing pin has a fifth distance to the second opening. The fourth distance equals to the height h1 of the first groove 730 and the height h3 of the fixing portion 740. The fifth distance equals to the height h2 of the second groove 750 and the height h3 of the fixing portion 740. The sum of the fourth and fifth distances is larger than the thickness H of the fixing arm 720. In addition, the sum of the height h1 of the first fixing pin 761, the height h2 of the second fixing pin 771 and the height h3 of the fixing portion 740 is not greater than the height H of the fixing arm 720, that is h1+h2+h3≦H.

Besides, the projected portion 150 of the light guide plate 100 has a height h4 and a width d4. The width of the projected portion 150 is not greater than the width D of the fixing portion 740, that is d4≦D. The height h4 of the projected portion 150 is not greater than the height of the fixing portion 740, that is h4≦h3. The light guide plate 100 has a thickness of h5, and the height h4 of the projected portion 150 is not greater than the thickness h4 of the light guide plate 100, that is h4≦h5. In other words, the sum of the height h1 of the first fixing pin 761, the height h2 of the second fixing pin 771 and the height h4 of the projected portion 150 is not greater than the height H of the fixing arm 720, that is h1+h2+h4≦H. Therefore, the light guide plate 100 will be rotated within the two fixing arms 720. The projected portions 150 of the light guide plate 100 can be positioned within the fixing portions 740.

Figure 4A:
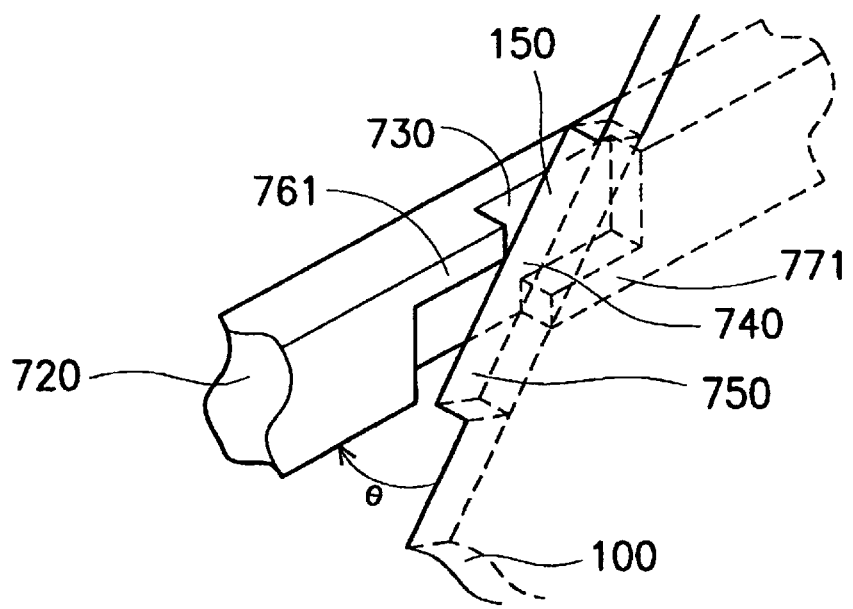
FIGS. 4A to 4C illustrate the assembly of the light guide plate and the frame.
Figure 4B:
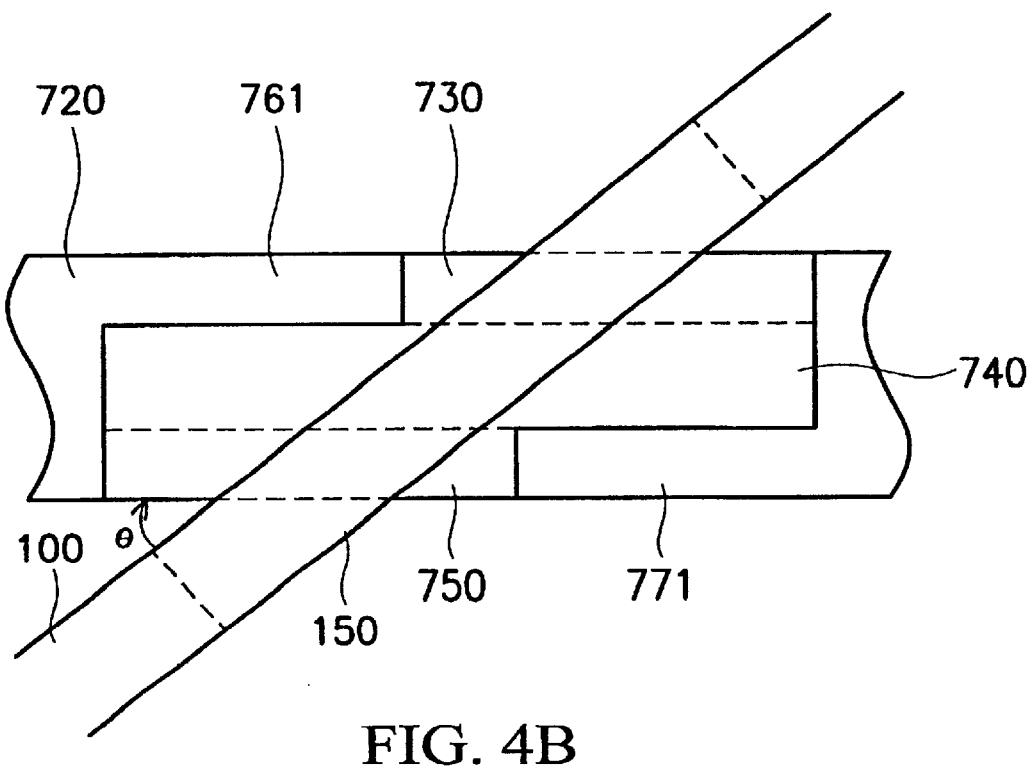
Figure 4C:
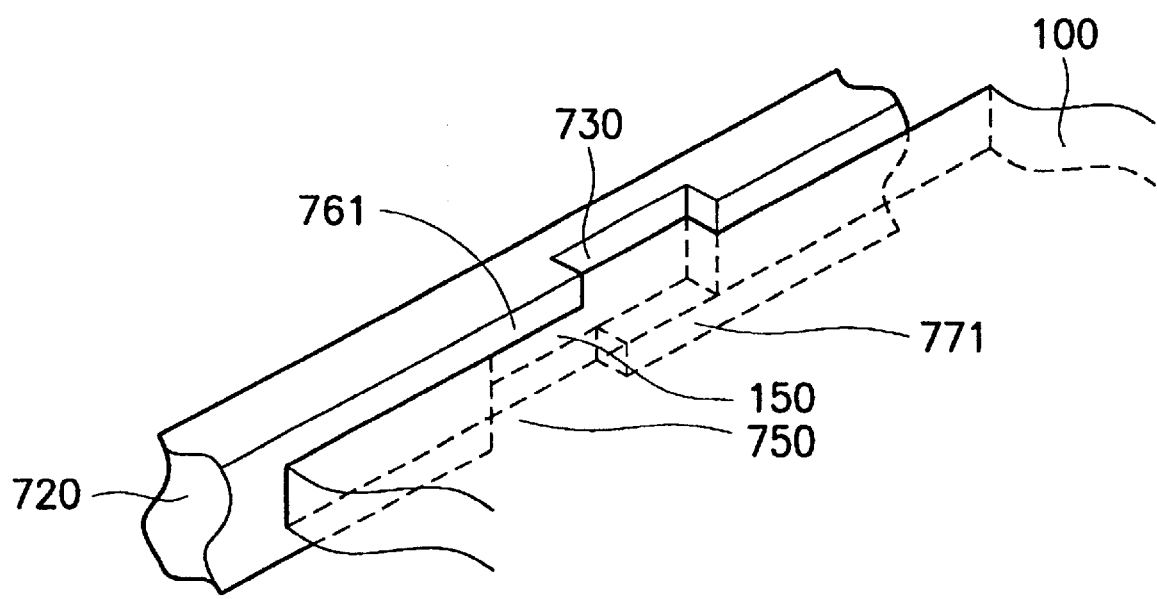

FIGS. 4A to 4C are perspective views illustrating the assembly of the light guide plate and the frame. As shown in FIG. 4A, an angle θ is formed between the light guide plate 100 and the fixing arm 720 of the frame, and the projected portions 150 of the light guide plate 100 are aimed at the first groove 730 of the fixing arm 720. Next, as shown in FIG. 4B, the projected portions 150 of the light guide plate 100 are inserted into the first groove 730, second groove 740 and the fixing portion 750. Next, as shown in FIG. 4C, the light guide plate 100 is rotated and then the projected portions 150 completely fill the fixing portion 740. Thus, the frame 700 can fixedly hold the light guide plate 100.

Furthermore, the projected portion 750 of the light guide plate 100 can be aimed at the second groove 750. The projected portion 750 can be inserted into the second groove 740, fixing portion 750 and first groove 730 in sequence. Finally, the frame 700 fixedly holds the light guide plate 100.

As the width d1 of the first groove 730 plus the width d2 of the second groove 750 are greater than the width D of the fixing portion 740, the angle θ formed between the light guide plate 100 and the frame 700 is not so strict. Thus, the invention increases assembly efficiency.

In the liquid crystal display, a diffusing device is further mounted on the light guide plate 100. The diffusing device includes a diffusing sheet, a prism sheet and a protecting film in sequence. The liquid crystal display further includes a reflector, a light source positioned inside the reflector, and a liquid crystal panel. The reflector can be combined with the frame or the light guide plate. The liquid crystal panel is mounted above the diffusing device to form the liquid crystal display.

In the invention, the frame has four arms, including two fixing arms and two linked arms to increase the strength thereof.

While the preferred embodiment of the present invention has been described, it is to be understood that modifications will be apparent to those skilled in the art without departing from the spirit of the invention. The scope of the invention, therefore, is to be determined solely by the following claims.

What is claimed is:

1. A frame for fixing a light guide plate, comprising:
a fixing arm comprising a fixing portion, a first groove and a second groove, the fixing portion having a first fixing side and a fixing second side, the first groove having a first end and the second groove having a second end, the first groove connecting with the fixing portion, the first fixing side of the fixing portion being aligned to the first end of the first groove, the second groove connecting with the fixing portion, and the second fixing side of the fixing portion being aligned to the second end of the second groove.

2. The frame for fixing the light guide plate as claimed in claim 1, wherein the first groove has a third end, the second groove has a fourth end, the first groove has a first distance between the first end and the third end, the second groove has a second distance between the second end and fourth end, the fixing portion has a third distance between the first and the second fixing sides, and the sum of the first and second distances is not less than the third distance.

3. The frame for fixing the light guide plate as claimed in claim 2, wherein the first distance is smaller than the third distance, and the second distance is smaller than the third distance.

4. A frame for fixing a light guide plate, the frame comprising two opposite fixing arms, each fixing arm comprising a first groove, a first fixing pin, a second groove, and a second fixing pin,
wherein the first groove has a first opening, the second groove has a second opening, the first fixing pin has a fourth distance to the first opening, the second fixing pin has a fifth distance to the second opening, and a sum of the fourth and fifth distances is larger than a thickness of the frame.

5. The frame for fixing the light guide plate as claimed in claim 4, wherein a fixing portion is formed between the first groove and the second groove, the fixing portion has a fixing portion length, the first fixing pin has a first pin length, the second fixing pin has a second pin length, and a sum of the first pin length and the second pin length is not greater than the fixing portion length.

6. A backlight unit for a liquid crystal display, comprising:
a light guide plate including a light-incident surface, a light-reflecting surface, two side surfaces formed at both sides of the light-incident surface, and each side surface having a protrusion; and
a frame comprising two opposite fixing arms, each fixing arm comprising a first groove, a second groove and a fixing portion, the first groove having a first end, the second groove having a second end, the fixed portion having a first fixing side and a second fixing side, the first fixing side of the fixing portion being aligned to the first end of the first groove, and the second fixing side of the fixing portion being aligned to the second end of the second groove,
wherein the light guide plate is combined with the frame by gliding and inserting the protrusion into the fixing portion through the first and second grooves.

7. The backlight unit for a liquid crystal display as claimed in claim 6, wherein the first groove has a third end, the second groove has a fourth end, the first groove has a first distance between the first end and the third end, the second groove has a second distance between the second end and fourth end, the fixing portion has a third distance between the first and second fixing sides, and a sum of the first and second distances is not less than the third distance.

8. The backlight unit for a liquid crystal display as claimed in claim 7, wherein the first distance is smaller than the third distance, and the second distance is smaller than the third distance.

9. The backlight unit for a liquid crystal display as claimed in claim 6, wherein each fixing arm comprises a first fixing pin and a second fixing pin, the first groove has a first opening, the second groove has a second opening, the frame has a thickness, the first fixing pin has a sixth distance to the first opening, the second fixing pin has a seventh distance to the second opening, and a sum of the sixth and seventh distances is larger than the thickness of the frame.

10. The backlight unit for a liquid crystal display as claimed in claim 9, wherein a first pin length of the first fixing pin plus a second pin length of the second fixing pin is not greater than the third distance of the fixing portion.

11. The backlight unit for a liquid crystal display as claimed in claim 6, wherein a height of each protrusion is not greater than a thickness of the light guide plate.

12. The backlight unit for a liquid crystal display as claimed in claim 6, further comprising:

a reflector including a reflecting surface toward the light-incident surface of the light guide plate;

a light source installed within the reflector, the reflector being reflecting lights of the light source;

a reflecting sheet positioned under the light guide plate; and a diffusing device located above the light guide plate.

13. The backlight unit for a liquid crystal display as claimed in claim 12, wherein the diffusing device comprises a diffusing sheet, a prism sheet and a protecting film, and the protecting film is adjacent to the light guide plate.

14. A backlight unit for a liquid crystal display, comprising:

a light guide plate having a side surface;

a protrusion formed on the side surface; and a frame having a height H, the frame comprising a first groove with a first height h1 and a first width d1, and a second groove with a second height h2 and a second width d2; and a fixing portion with a third height h3 and a third width D; wherein the first groove has a first end and the second groove has a second end, the fixing portion has a first fixing side and a second fixing side, the first fixing side of the fixing portion is aligned to the first end of the first groove, and the second fixing side of the fixing portion is aligned to the second end of the second groove;

the third width D of the fixing portion is not greater than a sum of the first width d1 and the second width d2, the height H of the frame is not greater than a sum of the first height h1, the second height h2, and the third height h3; and the light guide plate is combined with the frame by gliding and inserting the protrusion into the fixing portion through the first and second grooves.

15. The backlight unit for a liquid crystal display as claimed in claim 14, wherein the protrusion has a fourth height h4 and a fourth width d4, the fourth width d4 is not greater than the third width D, and the fourth height h4 is not greater than the third height h3.

16. The backlight unit for a liquid crystal display as claimed in claim 15, wherein the fourth height h4 is not greater than a thickness of the light guide plate.

* * * * *